United States Patent [19]
Huang Lo

[11] Patent Number: 6,076,265
[45] Date of Patent: Jun. 20, 2000

[54] LAWN MOWER HAVING RECIPROCATING CUTTER BLADE

[76] Inventor: Chin-Chu Huang Lo, No. 23-1, Hui-Lai Street, Yuan-Lin Chen, Chang Hua Hsien, Taiwan

[21] Appl. No.: 09/174,626

[22] Filed: Oct. 19, 1998

[51] Int. Cl.[7] .................................................. A01D 34/76
[52] U.S. Cl. ................................. 30/265; 30/276; 56/255
[58] Field of Search ............................. 30/263, 264, 265, 30/276; 56/295, 255

[56] References Cited

U.S. PATENT DOCUMENTS

| | | | |
|---|---|---|---|
| 2,555,428 | 6/1951 | Tuttle | 30/265 |
| 2,757,453 | 8/1956 | Brunson | 30/264 |
| 2,883,746 | 4/1959 | Gilsi | 30/263 |
| 3,774,379 | 11/1973 | Mizobata et al. | 30/264 |
| 4,987,732 | 1/1991 | Terai et al. | 30/265 |
| 5,239,755 | 8/1993 | Kramer | 30/264 |

*Primary Examiner*—Hwei-Slu Payer
*Attorney, Agent, or Firm*—Charles E. Baxley, Esq.

[57] ABSTRACT

A lawn mower includes a housing, and two cutter members rotatably attached to the housing and rotated relative to each other in a reciprocating action, such that the cutter members may be actuated as a shearing action for cutting and trimming purposes. The cutter members are not required to be rotated in a high speed such that the grass cut by the cutter members will not fly out in a fast speed. Two followers are secured to the cutter members respectively, and two cams are engaged with the followers for rotating the followers and thus the cutter members in the reciprocation action relative to each other for forming the shearing action.

2 Claims, 8 Drawing Sheets

FIG. 9

LAWN MOWER HAVING RECIPROCATING CUTTER BLADE

BACKGROUND OF THE INVENTION

1. Field of the Invention

The present invention relates to a lawn mower, and more particularly to a lawn mower having two cutter blades that are moved in a relative reciprocating action as a shearing action.

2. Description of the Prior Art

Typical lawn mowers comprise a cutter blade or a cutter line that are rotated in a high speed by a motor for cutting or trimming purposes. The cutter blade or the cutter line that is rotated in high speed is dangerous and may hurt the people easily. The grass cut by the cutter blade may fly out in a fast speed and may also hurt the people.

The present invention has arisen to mitigate and/or obviate the afore-described disadvantages of the conventional lawn mowers.

SUMMARY OF THE INVENTION

The primary objective of the present invention is to provide a lawn mower having two cutter blades moved in a relative reciprocating action as a shearing action, such that the cutter blades are not required to be rotated in a high speed and such that the grass cut by the cutter blades will not fly out in a fast speed.

In accordance with one aspect of the invention, there is provided a lawn mower comprising a housing, a first cutter member rotatably attached to the housing, a second cutter member rotatably attached to the housing, and means for rotating the first cutter member and the second cutter member relative to each other in a reciprocating action. The cutter members act as a shearing action for cutting and trimming purposes.

A tube is further secured to the first cutter member and rotatably attached to the housing, an axle is secured to the second cutter member and engaged through the tube and rotatably attached to the housing, the axle and the tube are rotated relative to each other in a reciprocating action for rotating the first cutter member and the second cutter member relative to each other in the reciprocating action.

A first follower is further secured to the tube and a second follower is further secured to the axle, the first follower and the second follower are rotated about the tube and the axle respectively in a reciprocating action for rotating the first cutter member and the second cutter member relative to each other in the reciprocating action.

The first follower and the second follower each includes an opening formed therein, the rotating means includes a pair of cams engaged in the openings of the first follower and the second follower respectively, and means for rotating the cams to rotate the first follower and the second follower about the tube and the axle respectively in the reciprocating action.

The rotating means includes a rod rotatably secured in the housing, the cams are secured to the rod and rotated in concert with the rod, and means for rotating the rod to rotate the cams.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
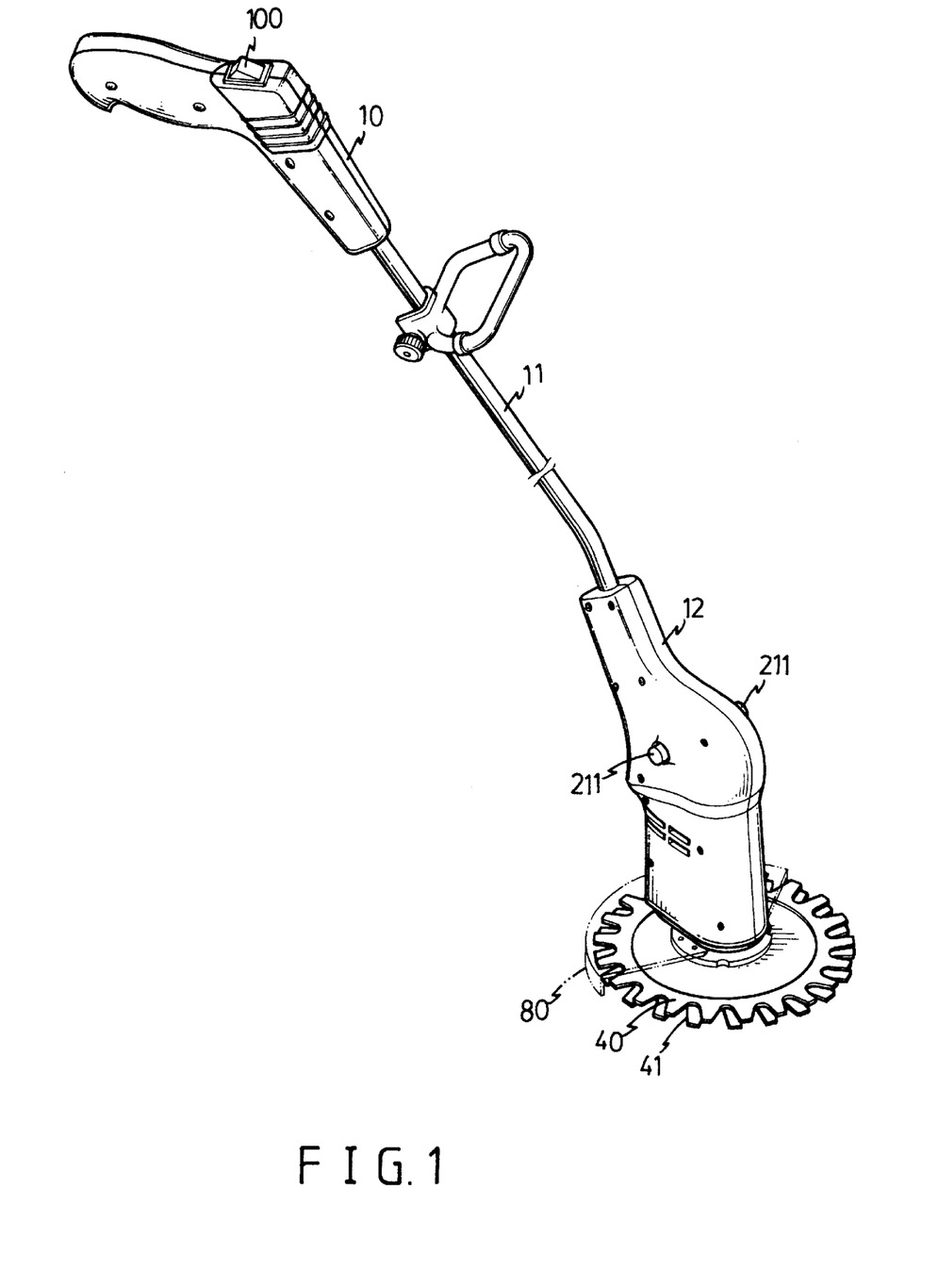
FIG. 1 is a perspective view of a lawn mower.
Figure 2:
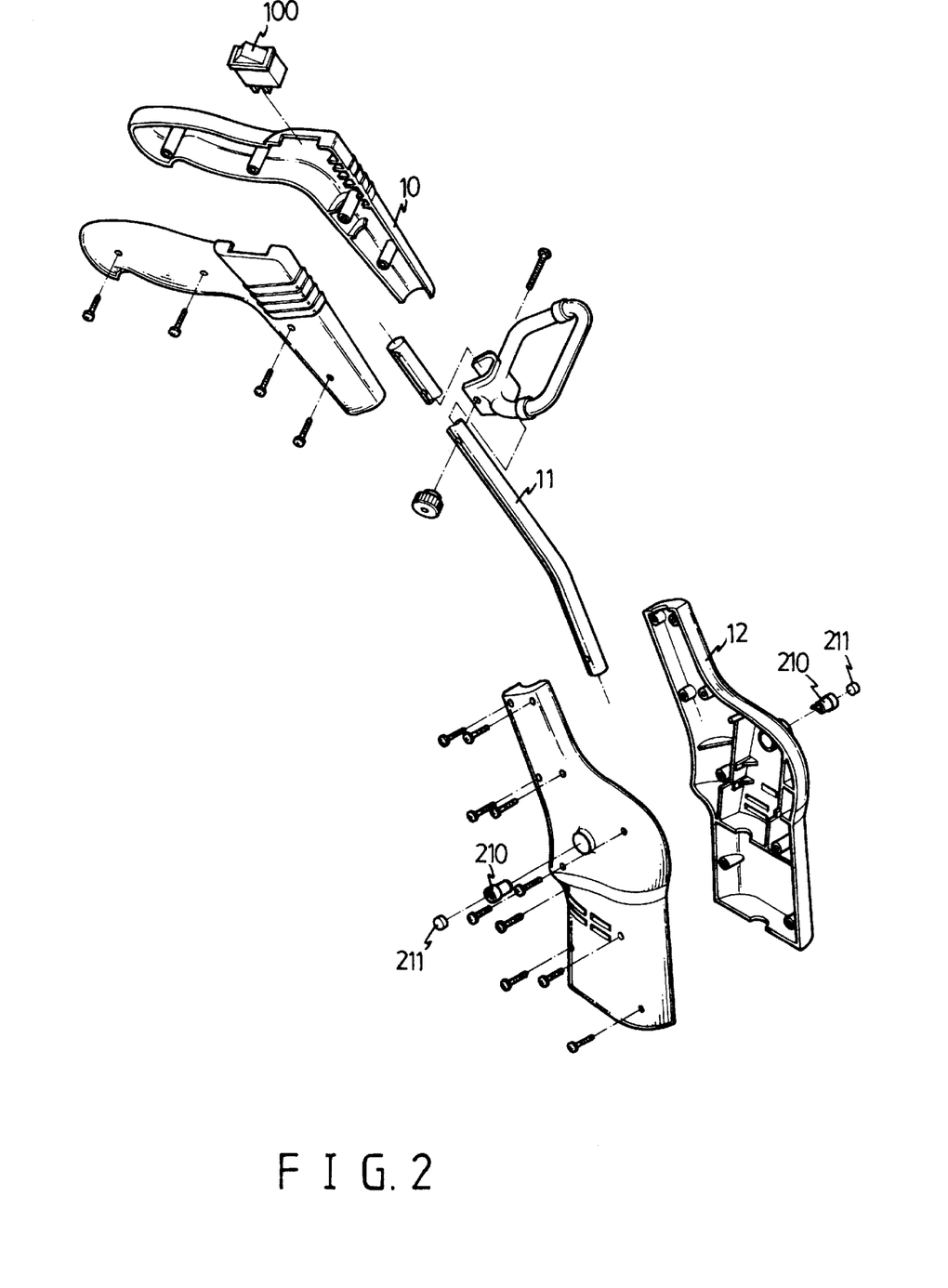
FIG. 2 is a partial exploded view of the lawn mower.
Figure 3:
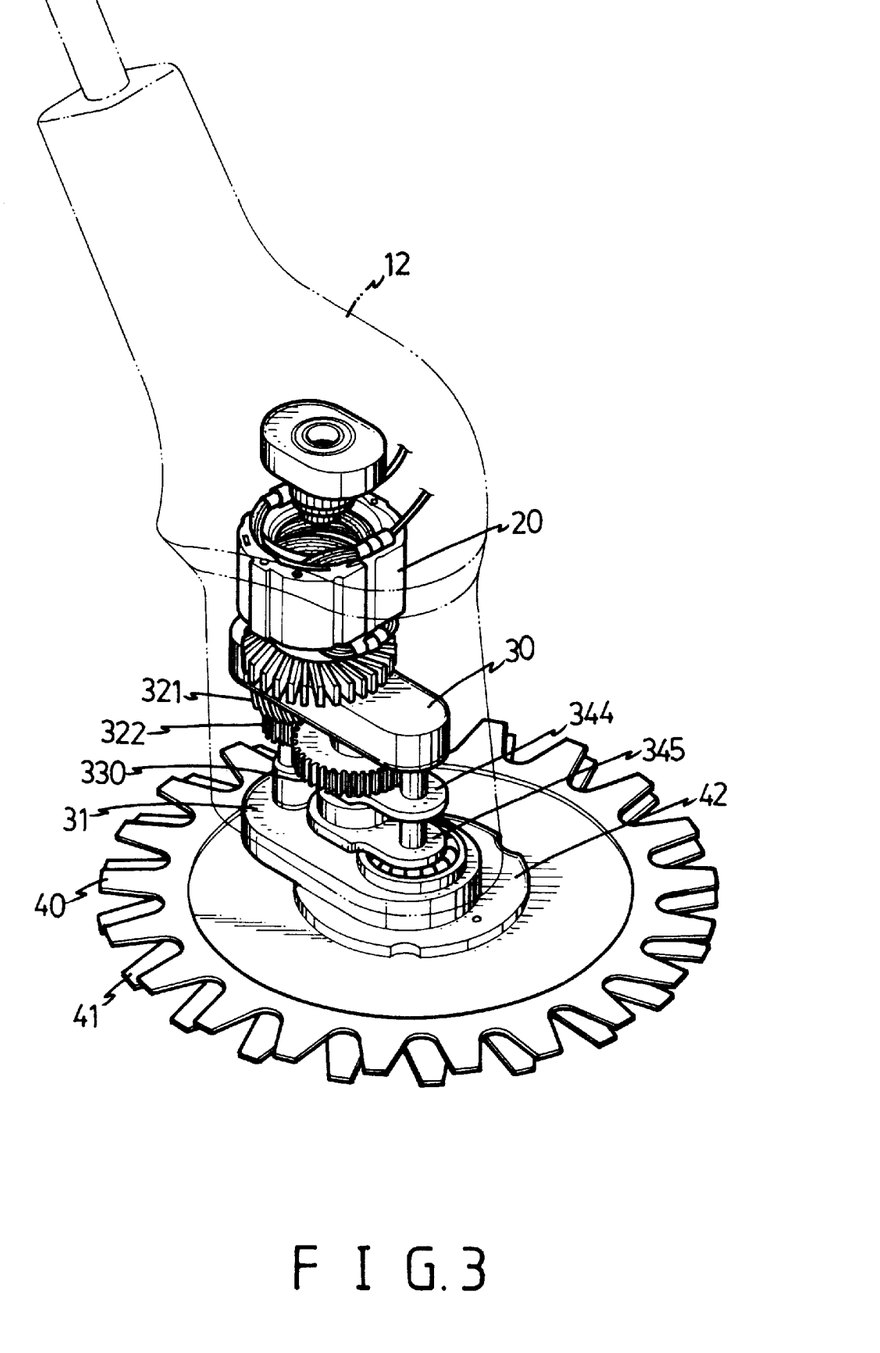
FIG. 3 is a partial perspective view of the lawn mower, in which the outer housing has been removed.
Figure 4:
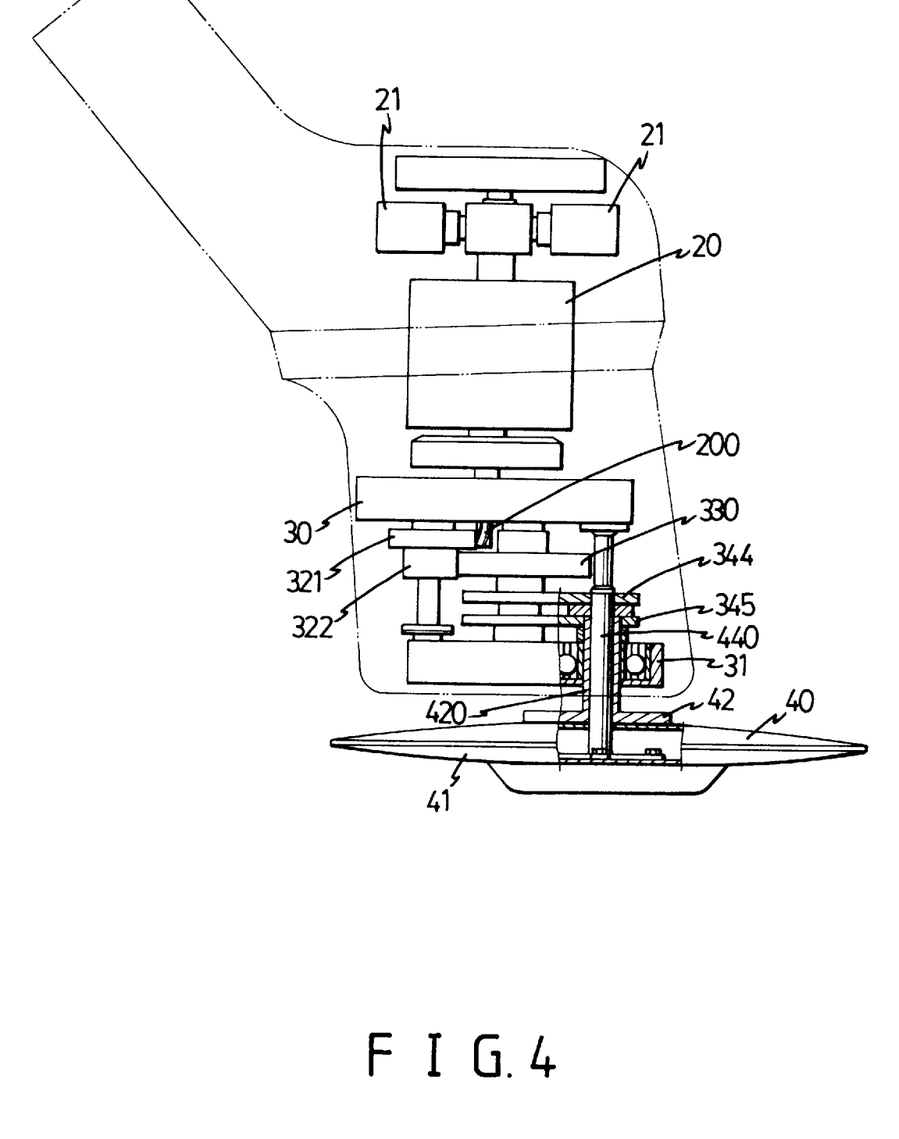
FIG. 4 is a partial side view of the lawn mower, in which a portion of the lawn mower is shown in cross section for showing the structure of the lawn mower.
Figure 5:
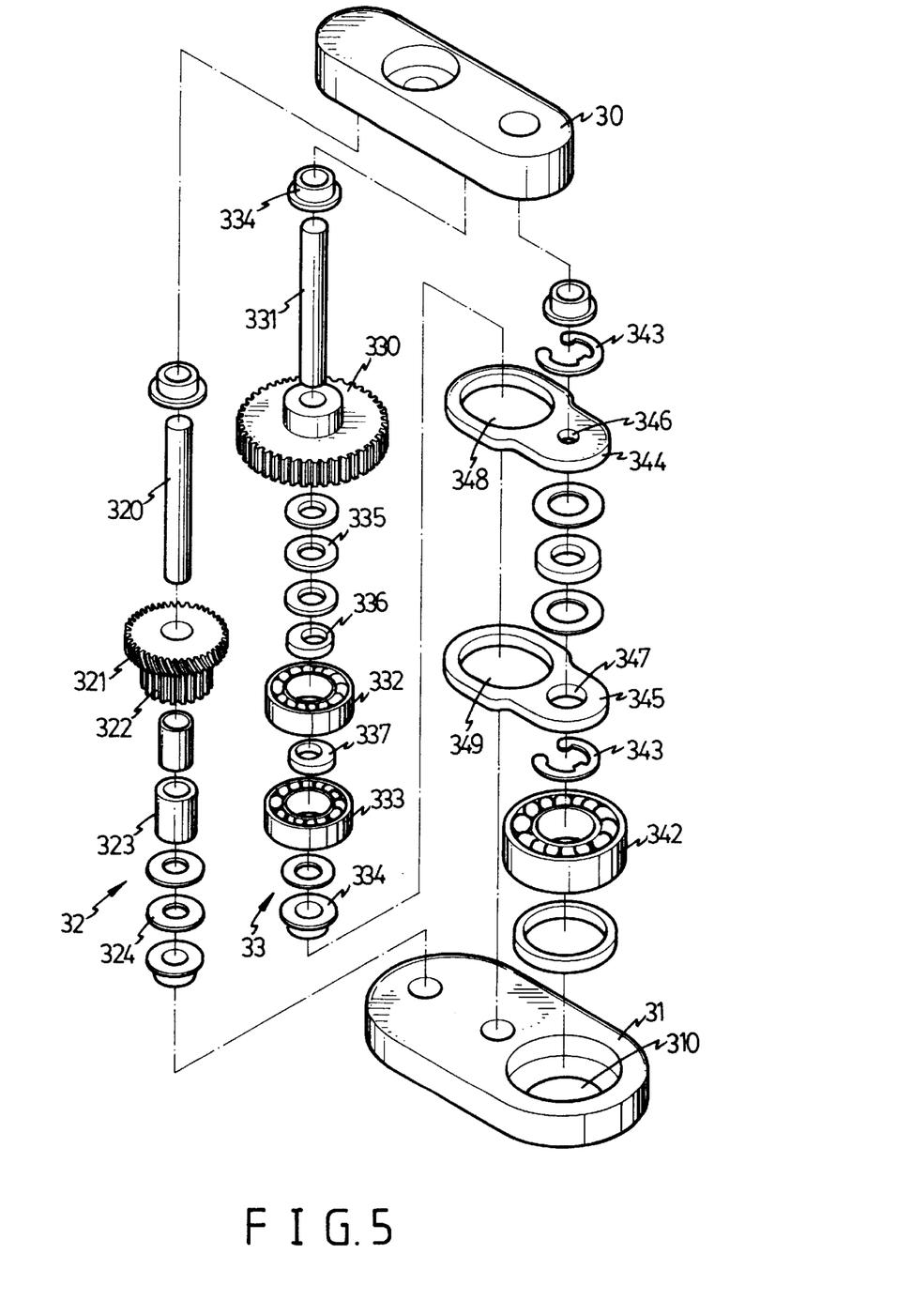
FIG. 5 is a partial exploded view of the cutter blades supporting and driving mechanism.
Figure 6:
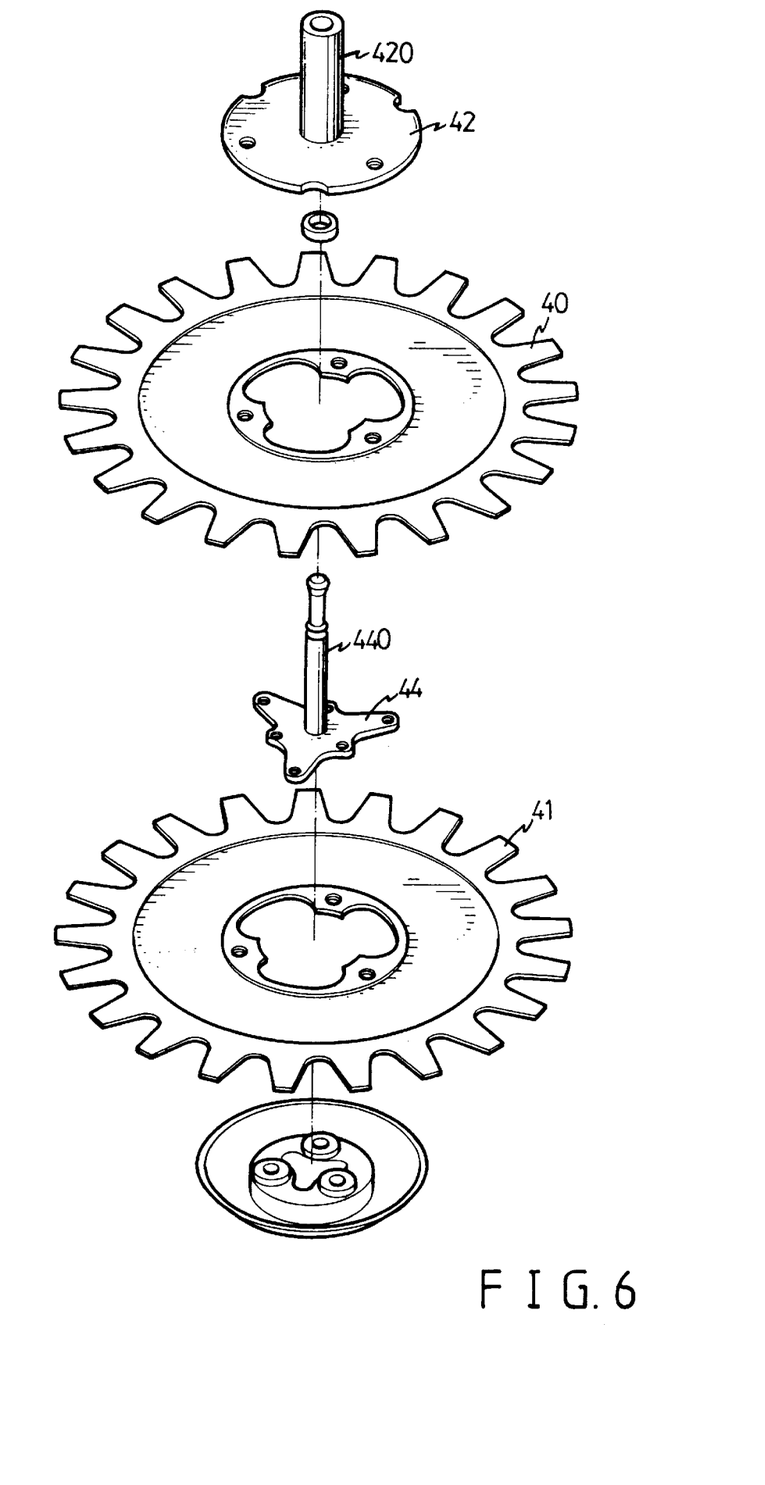
FIG. 6 is a partial exploded view of the cutter blades.
Figure 7:
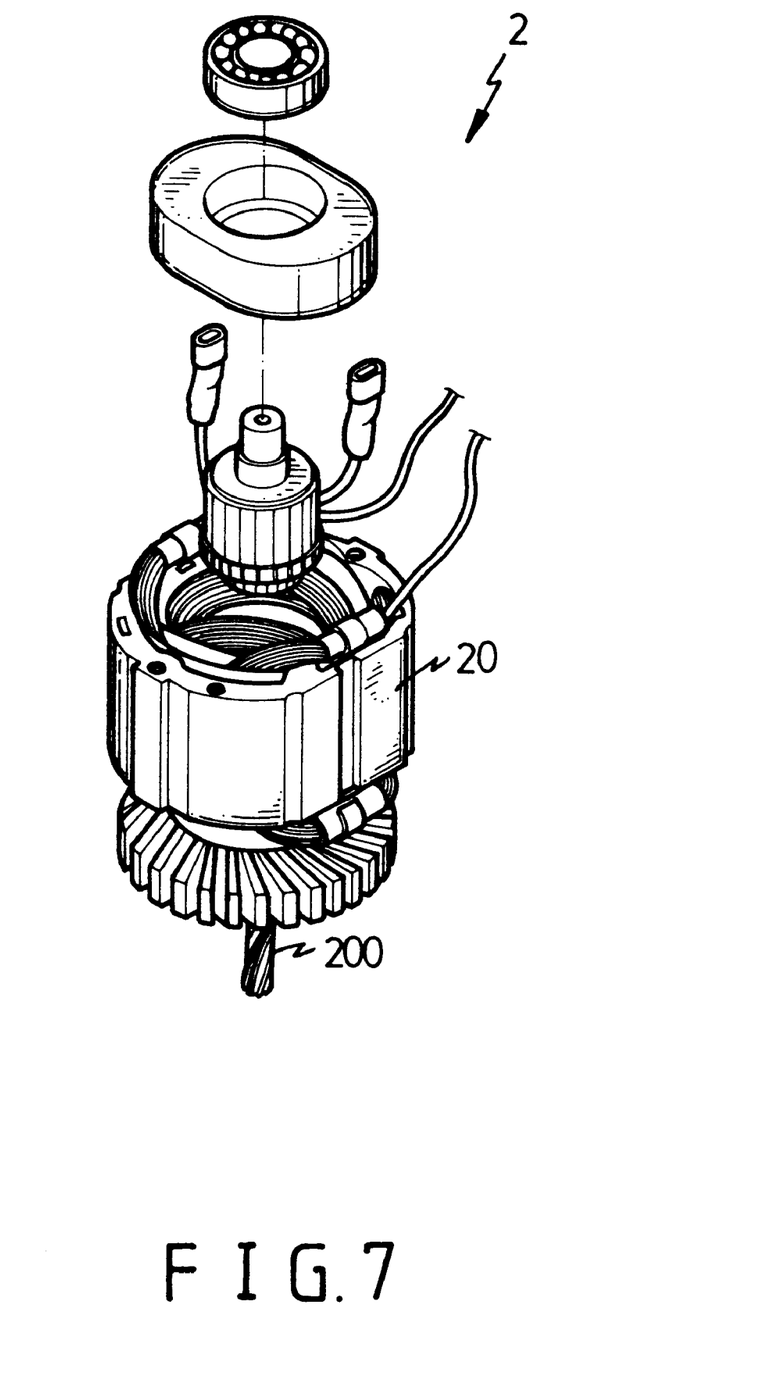
FIG. 7 is a partial exploded view of the driving motor.

Referring to the drawings, and initially to FIGS. 1 and 2, a lawn mower in accordance with the present invention comprises a housing 12, a rod 11 secured on top of the housing 12 for supporting a handle 10. A switch 100 is disposed in the handle 10 for actuating the lawn mower. It is preferable that the handle 10 and/or the housing 12 is formed by two halves that may be secured together by fasteners. A motor 20 (FIGS. 3, 4, and 7) is secured in the housing 12 and includes one or more carbon brushes 21 (FIG. 4) and preferably a pair of opposite carbon brushes 21. The brushes 21 each includes a barrel 210 and a cap 211 (FIG. 2) for attaching the brushes to the housing 12. The motor 20 includes an output shaft or a worm or a helical output stem 200 (FIGS. 4, 7) for driving the other members.

Referring next to FIGS. 3–6 and again to FIG. 1, a pair of bars 30, 31 are secured in the housing 12. Two gearing mechanisms 32, 33 each includes a rod 320, 331 secured between the bars 30, 31 and parallel to each other. A gear 321 and a pinion 322 are solidly secured together and are secured to or preferably rotatably attached to the rod 320 and supported in place by bearings 323 and washers 324 etc. The gear 321 is engaged with the output shaft 200 of the motor 20 such that the gear 321 and the pinion 322 may be driven by the motor 20. Another gearing mechanism 33 includes a gear 330 secured to the rod 331 and rotated in concert with the rod 331 and engaged with the pinion 322 such that the rod 331 and the gear 330 may be driven by the motor 20. Two cams 336, 337 are secured to the rod 331 and rotated in concert with the rod 331 and the gear 330 and supported in place by bearings 332, 333, 334 and washers 335. Two followers 344, 345 each includes an oval-shaped or oblong opening 348, 349 for receiving the cams 336, 337 respectively (FIGS. 8, 9) and for allowing the followers 344, 345 to be moved by the cams 336, 337.

Figure 8:
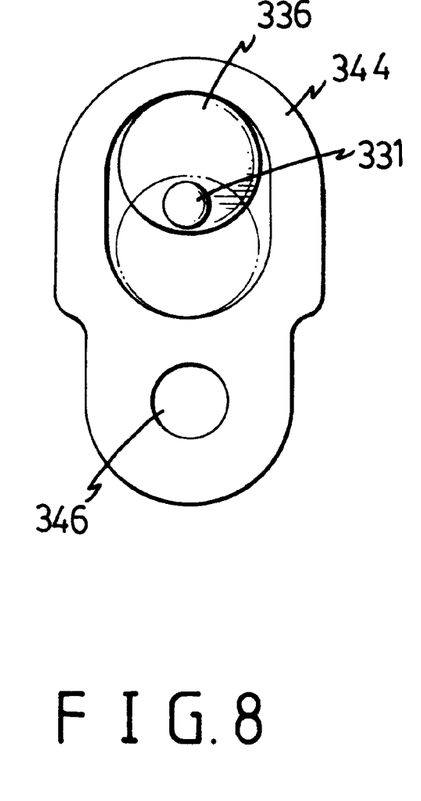
FIGS. 8 and 9 are schematic views illustrating the operation of the lawn mower.
Figure 9:
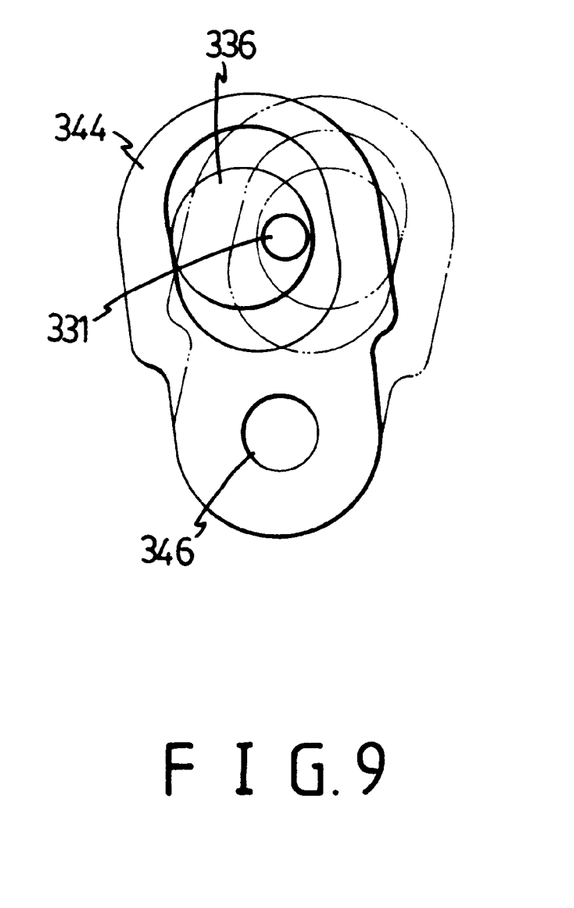

A cutter blade or a cutter wheel 40 (FIGS. 4, 6) is secured to a plate 42 by fasteners, and the plate 42 includes a tube 420 extended upward through a hole 310 of the bar 31 and rotatably supported in place by bearings 342 and a clamping ring 343. The follower 345 includes a hole 347 for receiving the tube 420. The tube 420 is secured to the follower 345 by such as a force-fitted engagement, or by keys or by welding process, such that the follower 345 may be rotated about the tube 420 by the cam 337 (similar to the follower 345 as shown in FIGS. 8 and 9) and such that cutter wheel 40 may be rotated in a reciprocating action by the motor 20 via the gearing mechanisms 32, 33 and the follower 345 and the tube 420. Another cutter wheel 41 is secured to a panel 44 which includes an axle 440 extended through the tube 420 and engaged through a hole 346 of the follower 344 and secured to the follower 344 by such as a force-fitted engagement, or by keys or by welding process, such that the follower 344 may be rotated about the axle 440 by the cam 336 (FIGS. 8 and 9) and such that cutter wheel 41 may be rotated in a reciprocating action by the motor 20 via the gearing mechanisms 32, 33 and the follower 344 and the axle 440. The axle 440 includes an upper end rotatably secured to the bar 30. The cams 336, 337 are preferably arranged opposite to each other (FIG. 5) for allowing the cutter wheels 40, 41 to be rotated relative to each other as a shearing action and for allowing the cutter wheels 40, 41 to cut or to trim the grass. A spacer or one or more bearings are provided between the cutter wheels 40, 41 for spacing the cutter wheels 40, 41 and for preventing the cutter wheels 40, 41 from interferring with each other.

The cutter wheels 40, 41 are not required to be rotated in high speed such that the grass cut by the cutter wheels 40, 41 will not fly out in the fast speed and will not hurt the people. A protective cover 80 (FIG. 1) may further be provided for partially shielding the cutter wheels 40, 41 and for preventing the cutter wheels 40, 41 from hurting the user.

Accordingly, the lawn mower has two cutter blades moved in a relative reciprocating action as a shearing action, such that the cutter blades are not required to be rotated in a high speed and such that the grass cut by the cutter blades will not fly out in a fast speed.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A lawn mower comprising:

a housing, a first cutter member rotatably attached to said housing, a second cutter member rotatably attached to said housing, and means for rotating said first cutter member and said second cuter member relative to each other in a reciprocating action, and including a tube secured to said first cutter member and rotatably attached to said housing, an axle secured to said second cutter member and engaged through said tube and rotatably attached to said housing, said axle and said tube being rotated relative to each other in a reciprocating action for rotating said first cutter member and said second cuter member relative to each other in the reciprocating action, a first follower secured to said tube, a second follower secured to said axle, said first follower and said second follower being rotated about said tube and said axle respectively in a reciprocating action for rotating said first cutter member and said second cuter member relative to each other in the reciprocating action, said first follower and said second follower each including an opening formed therein, a pair of cams engaged in said openings of said first follower and said second follower respectively, and means for rotating said cams to rotate said first follower and said second follower about said tube and said axle respectively in the reciprocating action, said cutter members being acting as a shearing action for cutting and trimming purposes.

2. The lawn mower as claimed in claim 1, wherein said means for rotating said cams includes a rod rotatably secured in said housing, said cams are secured to said rod and rotated in concert with said rod, and means for rotating said rod to rotate said cams.

* * * * *